US011640478B2

(12) United States Patent
Summers et al.

(10) Patent No.: US 11,640,478 B2
(45) Date of Patent: May 2, 2023

(54) TRAVEL IDENTITY TOKENING

(71) Applicant: Bank of America Corporation, Charlotte, NC (US)

(72) Inventors: Harvey Summers, Richmond, VA (US); Gilbert Gatchalian, Union, NJ (US); Daniel J. Serna, The Colony, TX (US); Brandon Sloane, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 266 days.

(21) Appl. No.: 16/936,581

(22) Filed: Jul. 23, 2020

(65) Prior Publication Data

US 2022/0027500 A1    Jan. 27, 2022

(51) Int. Cl.
*G06F 21/00* (2013.01)
*G06F 21/62* (2013.01)
(Continued)

(52) U.S. Cl.
CPC .......... *G06F 21/6245* (2013.01); *G06F 21/45* (2013.01); *G06Q 10/02* (2013.01); *G06Q 50/14* (2013.01); *G06Q 50/265* (2013.01); *H04L 63/0407* (2013.01); *H04L 63/0853* (2013.01); *H04L 63/0876* (2013.01);
(Continued)

(58) Field of Classification Search
CPC .................. G06F 21/6245; G06F 21/45; G06F 2221/2111; G06F 21/31; G06F 21/32; G06F 21/35; G06F 21/43; G06Q 10/02; G06Q 50/14; G06Q 50/265; H04L 63/0407;
(Continued)

(56) References Cited

U.S. PATENT DOCUMENTS 7,366,677 B1 * 4/2008 Liu .................. G06Q 10/02
709/204
2012/0254943 A1 * 10/2012 Li .................. H04L 9/3213
726/3

(Continued)

OTHER PUBLICATIONS

Bodkhe et al., "BloHosT: Blockchain Enabled SmartTourism and Hospitality Management", 2019 International Conference on Computer, Information and Telecommunication Systems (CITS), Date of Conference: Aug. 28-31, 2019.*

(Continued)

*Primary Examiner* — Morshed Mehedi

(57) ABSTRACT

A system for leveraging a tokening system to authenticate a traveler while maintaining anonymity of the traveler is provided. The system may include a secure central server configured to store identification data associated with a plurality of users. The system may also include a mobile token application for providing a token identifier representing a user's identification data. The mobile token application may be activated by the central server on a mobile device of the user registered with the central server and stored in a secure storage on the mobile device of the user. The system may also include a travel service provider. The travel service provider may be configured to enable reserving a travel reservation file. The travel service provider may be enabled to retrieve a token identifier from the user's mobile device as representing the identification of the user and verify the token identifier with the central server.

12 Claims, 5 Drawing Sheets

(51) Int. Cl.
| | |
|---|---|
| H04L 9/40 | (2022.01) |
| G06F 21/45 | (2013.01) |
| H04W 12/02 | (2009.01) |
| G06Q 50/14 | (2012.01) |
| G06Q 50/26 | (2012.01) |
| H04W 4/029 | (2018.01) |
| G06Q 10/02 | (2012.01) |

(52) U.S. Cl.
CPC ........... *H04W 4/029* (2018.02); *H04W 12/02* (2013.01); *G06F 2221/2111* (2013.01)

(58) Field of Classification Search
CPC ........... H04L 63/0853; H04L 63/0876; H04W 4/029; H04W 12/02; H04W 4/02
See application file for complete search history.

(56) References Cited

U.S. PATENT DOCUMENTS

| | | | | |
|---|---|---|---|---|
| 2014/0298023 | A1* | 10/2014 | Oppermann | G06F 21/60 |
| | | | | 713/168 |
| 2015/0153935 | A1* | 6/2015 | Underwood, IV | H04L 67/60 |
| | | | | 715/738 |
| 2016/0066004 | A1* | 3/2016 | Lieu | H04N 21/42684 |
| | | | | 725/29 |
| 2016/0232515 | A1* | 8/2016 | Jhas | G06Q 20/3278 |
| 2019/0080074 | A1* | 3/2019 | Kawai | H04L 63/0815 |
| 2021/0080282 | A1* | 3/2021 | Goei | B60L 53/66 |
| 2021/0211289 | A1* | 7/2021 | Lin | H04L 9/3213 |
| 2022/0027500 | A1* | 1/2022 | Summers | G06F 21/43 |

OTHER PUBLICATIONS

"The Known Traveller: Unlocking the Potential of Digital Identity for Secure and Seamless Travel," http://www3.weforum.org/docs/WEF_The_Known_Traveller_Digital_Identity_Concept.pdf, World Economic Forum, Jan. 2018.
"Travel Identity of the Future," https://www.sita.aero/resources/type/white-papers/travel-identity-of-the-future, SITA, 2016.
"Tokenization (data security)," https://en.wikipedia.org/wiki/Tokenization_(data_security), Wikimedia Foundation, Inc., Jun. 9, 2020.
"Fingerprint (computing)," https://en.wikipedia.org/wiki/Fingerprint_(computing), Wikimedia Foundation, Inc., Jun. 9, 2020.
"Payment Tokenization Explained," https://squareup.com/us/en/townsquare/what-does-tokenization-actually-mean, Square, Inc., Retrieved on Jun. 17, 2020.

* cited by examiner

TRAVEL IDENTITY TOKENING

FIELD OF TECHNOLOGY

Aspects of the disclosure relate to authentication of a traveler while maintaining anonymity of the traveler's identity.

BACKGROUND OF THE DISCLOSURE

A traveler is required to display the traveler's identity throughout the different parts of preparing and reserving travel arrangements as well as during the travelling itself. The traveler's identity is exposed to many different entities involved in the travel arrangements. Most entities do incorporate high level measures of security within their systems to protect a user's identity from identity theft.

However, during the reserving of travel flights, the user's identity may be passed on to numerous third-party systems such as airline/hotel reservation systems and airline/hotel checking-in systems. Despite the security of each third-party's system, the passing on of the user's identity increases the chance of identity theft.

It would be desirable to eliminate the need to display and transfer the traveler's identity by enabling the traveler to be identifiable only by a token throughout the travel. Each entity involved in the process of the travelling for the traveler, may be in communication with a single trusted source. The single trusted source may be the only source that stores personal identifying data of the traveler. Each entity involved in the process of travel reservations and confirmations may be enabled to, using the token, authenticate the traveler via the single trusted source.

SUMMARY OF THE DISCLOSURE

A method for leveraging a tokening system to authenticate a traveler is provided. The tokening system may be leveraged to maintain anonymity of the traveler. The method may include activating a mobile token application for a user. The user may be the traveler. The user may be a user of a secure central server. The secure central server may be a server associated with a central system. The central system may be a single trusted source for the authentication of the traveler.

The mobile token application may be activated by the central server. The mobile token application may be configured for providing a token identifier representing the user's personal identification data. The user's personal identification data may include the user's name and a date of birth of the user. The user's personal identification data may also include the user's social security number. In some embodiments, the personal identification data may also include the user's passport identification number and/or driver's license number.

The mobile token application may be activated and then stored in a secure storage on a mobile device of the user.

It should be appreciated that the mobile device of the user may also be registered within a personal profile account associated with the user on the central server. The mobile device may be registered and stored using a device identifier.

Examples of mobile devices that may be suitable for use with the invention include, but are not limited to, cellphones, smartphones, personal digital assistants ("PDA"), tablet computers and laptops.

The method may also include storing, in the central server, a user identifier that identifies the user of the mobile device. The method may also include storing a token serial number that identifies the mobile token application and also storing a device identifier that identifies the mobile device.

The user identifier may only be stored at the central server. The user identifier may be linked at the central server to the user's personal identification data. However, it should be appreciated that the user identifier and the linked personal identification data may not be accessed by any third party including the travel service provider.

Following the activating of the mobile token application, the mobile device may be enabled for reserving, using the mobile token application on the mobile device, a travel reservation file for the user. The reserving may be enabled using at least one travel service provider. The travel service provider may be in direct communication with the central server. The communication may be an electronic communication.

The reserving may include receiving, at the travel service provider, the token identifier from the mobile token application on the user's mobile device. The receiving may also include receiving the device identifier from the mobile token application. The reserving may further include transmitting the token identifier and the device identifier, from the travel service provider to the central server.

The reserving may also include authenticating the token identifier and the device identifier by the central server. The authenticating may include searching the database on the central server for the user identifier that is associated with both the token identifier and the device identifier.

In response to the authenticating, the method may include reserving the travel reservation file by the travel service provider. The method may also include storing within the travel reservation file, the token identifier as the representation of the identity of the user. The method may also include storing, in the central server, the token identifier and a travel reservation file identifier, in a record associated with the token serial number.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
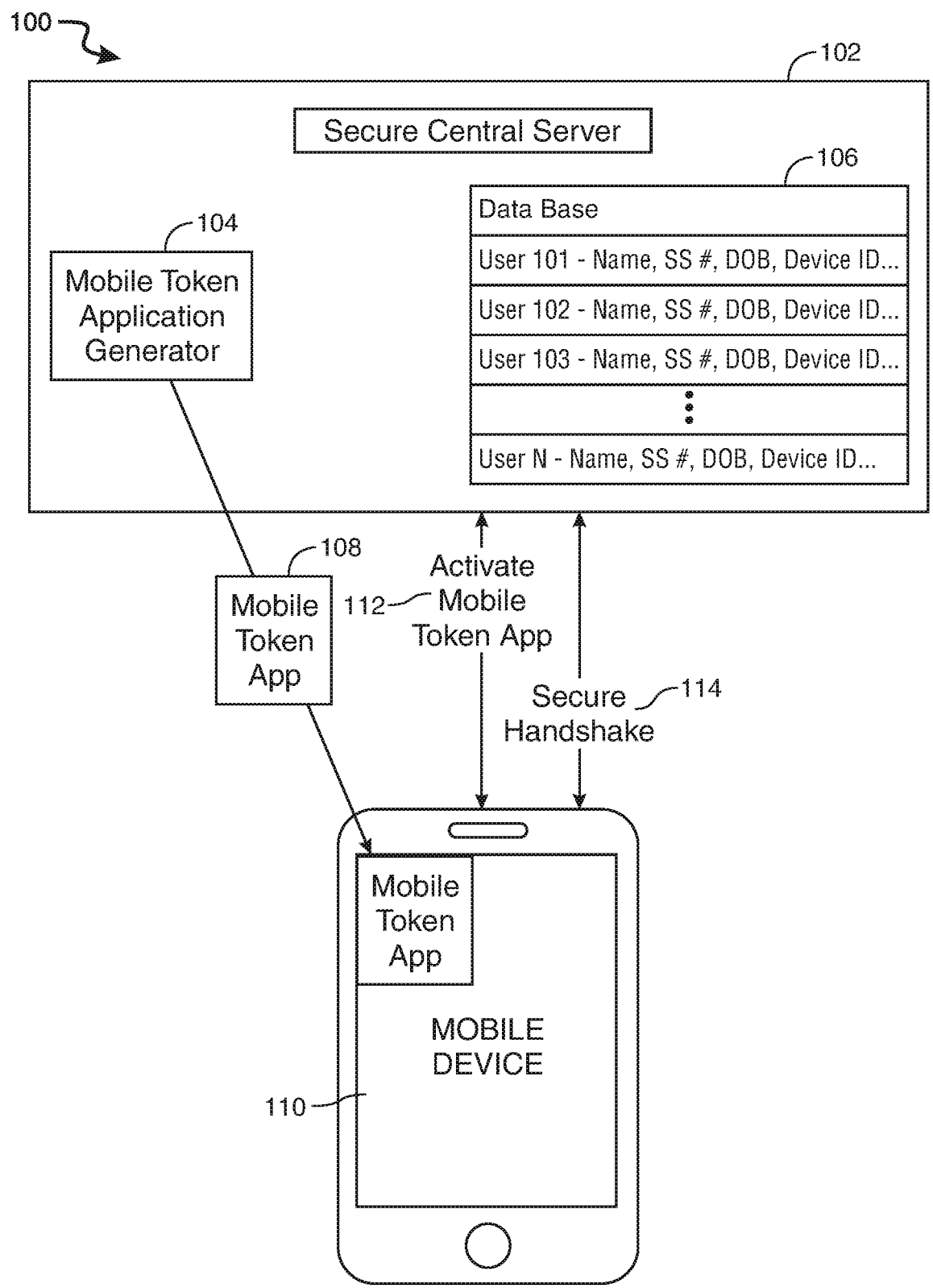
FIG. 1 shows an illustrative system in accordance with principles of the disclosure.

A system for leveraging a tokening system to authenticate a traveler is provided. The authentication of the traveler may be enabled while maintaining anonymity of an identity of the traveler. The system may include a secure central server. The secure central server may be a single trusted source for storing and protecting the identity of the traveler. The secure central server may be a server for a central system. In some embodiments the central system may be a financial system.

The traveler may be a user of the financial system and may use the financial system for protection and security of the user's identity.

The central server may be configured to store personal identification data associated with a plurality of users of the central system. Each user may include a user identifier. Alongside each user identifier, the user's personal identification data may be included. The personal identification data may include the name of each user. The personal identification data may also include the date of birth of each user. The personal identification data may also include the social security number for each user. In some embodiments, the personal identification data may also include a passport identification number and/or driver license identification of each user.

A user may register the user's mobile device with the central server. A device identifier may be assigned to the mobile device and may also be stored with the user identifier. The registering of the user's mobile device may be in order to protect and secure any outsider or hacker from accessing the mobile token application on the mobile device of the user.

When a user of the central system may prefer to maintain anonymity, the user may be enabled to activate the mobile token application on the user's mobile device and utilize the token identifier provided by the mobile token application as representation of the identity of the user.

The central server may act as the back-end server for activating the mobile token application. The central server may include a mobile token application generator. The mobile token application generator may be configured to generate a unique mobile token application for each user. The mobile token application may be generated for activation on a mobile device associated with each user. The mobile token application may be a software application and/or hardware element.

The activation of the mobile token application may enable a mobile token application to be planted and activated on the user's mobile device. As such, the mobile device may receive permission to activate the mobile token application. The mobile device may receive a communication from the central server. The communication may include the mobile token application (or a hyperlink that enables download of the mobile token application) and an activation code. The mobile device may validate the activation code by communicating with the central server. The mobile device may receive selection of a PIN. The mobile device may validate the PIN with the central server. Upon completion of the activation code validation and PIN validation, the mobile token application may be activated on the mobile device. The central server may store a user identifier that identifies a user of the mobile device, a token serial number that identifies the mobile token application and a device identifier that identifies the mobile device.

The mobile device may be enabled to be in direct communication with the central server.

The mobile token application may be stored in a secure storage within the mobile device. The mobile token application may be stored in an encrypted manner in a secure area on the user's mobile device so that the mobile token application cannot be hacked or tampered.

The mobile token application may reside temporarily on the mobile device. The mobile token application may reside within the secure storage for a pre-determined amount of time. The pre-determined amount of time may be the time of expiration of a travel reservation of the user of the mobile device. When a token identifier is provided for identification for the user in a travel reservation, the mobile token application may be set to expire and be inoperative after the set date of the travel reservation. By enabling the application to be temporary, this may reduce the chance for the mobile token application to be compromised by an outsider.

Each time a user may reserve a travel reservation for travelling, the system may include activating a new mobile token application on the user's mobile device to better protect the identity of the user and in order to avoid an attacker from compromising the token application.

The system may also include a travel service provider. The travel service provider may be a third-party provider for travelling. The travel service provider may also be enabled to be in direct communication with the central server. The travel service provider may be accessed via an online website. The travel service providers system may communicate with the central server.

The travel service provider may be configured to enable creating a travel reservation file for a travel reservation. The travel reservation file may be reserved for the user while maintaining anonymity of the user's identity. The travel service provider may include an online portal for reserving travel reservations.

The travel service provider may include a token reader. The token reader may be computer hardware enabled for retrieving token identifiers from a user's mobile device as a representation of the identification of each user.

When the mobile device is in communication with the travel service provider, the central server may be configured to transmit the mobile token application to the mobile device and activate the mobile token application on the mobile device.

The mobile token application may be configured to generate a token identifier for use as identity of the user of the mobile device. The mobile device may be configured to transmit the token identifier to the travel service provider as representative of the identity of the user in order to create and reserve the travel reservation file.

The central server may be further configured to receive the token identifier from the travel service provider. The central server may further verify the token identifier to be associated with the mobile device of the user.

In response to the verification, the central server may be configured to confirm the verification with the travel service provider. The central server may be further configured to store the travel reservation within a token record associated with the user on the central server. The token record may be stored under the token serial number associated with the mobile token application.

It should be appreciated that the central server may store a token record list for each user of the system. The token record list may include a record for each generated and activated mobile token application activated on a user's mobile device. When a new mobile token application is activated on a device, the mobile token application data may be stored in a new record. Each time the mobile token application generates a token identifier for a user as identification of the user within a transaction, the token identifier and the data associated with the transaction may be stored in the record. This may enable the central system to monitor and keep track of the transactions occurring. Each transaction may be a step in the process for reserving and confirming a travel reservation and travel reservation file for the user.

In some embodiments, the system may also include a point-of-travel ("POT"). The POT may be a POT device.

The POT device may be a self-standing computer kiosk to check-in for an airplane flight and/or other forms of travelling.

The POT device may be in direct communication with the central server. The POT device may be enabled to accept token identification as a representation of a user's identity. The POT device may include a token reader. The token reader may be configured to retrieve a token identifier from the user's mobile device as a confirmation for the travel reservation.

When the user is at the POT to confirm travelling, the POT may be configured to retrieve from the user's mobile device, a payload from the mobile device to the POT device. The payload may include the geolocation of the mobile device in real-time. The payload may also include the token identifier. The payload may also include metadata associated with the mobile device.

Following receipt of the payload at the POT device, the POT device may be configured to transmit the payload to the central server. The POT may also be configured to transmit a geolocation of the POT device along with POT device data. The central server may be enabled to verify the user's travel reservation based on the geolocation and the token identifier included in the payload.

The central server may verify the payload with the POT by confirming that the token identifier retrieved by the POT device maps to the token identifier stored in the first record associated with the user. The central server may further verify the payload with the POT by confirming that the geolocation of the mobile device matches the geolocation of the POT device. The central server may also verify the payload with the POT by confirming that the mobile device transmitting the payload is the mobile device associated with the user of the central server.

It should be appreciated that a first token identifier generated by the mobile token identifier may be different from a second token identifier generated by the mobile token identifier at a later point in time. Although two or more tokens may differ, each token identifier generated by the mobile token identifier may include data that identifies the mobile device and the token application serial number. Token identifiers generated by the mobile token generator may not include data identifying a traveler. A token identifier, when received by the central server, may be used to identify a traveler by matching or correlating data in the token identifier with data stored, and associated with, the traveler in the central server.

The system may include multi-factor authentication to authenticate the token identifier as representing the identification of the user. The multi-factor authentication may include, following the verifying of the token identifier, verifying the mobile device further by transmitting a message from the central server to the mobile device of the user. The message may be a text-message. The message may be a short message service ("SMS.") The message may be an e-mail.

The message may include a one-time password ("OTP"). The OTP may be generated by the central server for the user's mobile device. An OTP application may be embedded on the user's mobile device. The central server may transmit an OTP request to the OTP application. The OTP application may generate an OTP. The OTP may then be transmitted to the user in a message. The OTP may then be inputted into a display box at the POT device. The POT device may transmit the OTP to the central server to further confirm the mobile device as being the mobile device of the user.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an illustrative system 100 in accordance with principles of the disclosure. System 100 may include a central server 102. Central server 102 may be a secure central server. Central server 100 may be a server associated with a system of an entity. The entity may be a secure financial entity. The entity may include a plurality of users. Identification data, financial data and other personal data may be stored in the central server for each of the users of the entity.

Central server 102 may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning algorithms, AI algorithms, or any other suitable information or data structures. Components of the server may be linked by a system bus, wirelessly or by other suitable interconnections. System components may be present on one or more circuit boards. In some embodiments, the components may be integrated into a single chip. The chip may be silicon-based.

The server 102 may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable the server to perform various functions. For example, the non-transitory memory may store software applications such as an operating system, application programs, and an associated database. Some or all of computer executable instructions of the server may be embodied in hardware or firmware components of the server.

The server 102 may include cloud computing and virtualization implementations of software. Such implementations may be designed to run on a physical server supplied externally by a hosting provider, a client, or other virtualized platform.

Software application programs, which may be used by the server, may include computer executable instructions for invoking user functionality related to communication, such as email, short message service ("SMS"), voice input and speech recognition applications. Software application programs may utilize one or more algorithms that formulate predictive machine responses, formulate database queries, process human caller inputs, process human agent inputs, or any other suitable tasks.

The server 102 may include a communication circuit. The communication circuit may include a network interface card or adapter. When used in a WAN networking environment, apparatus may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the server may be operated in a client-server configuration to permit retrieval of web pages from a web-based server. Web browsers can be used to display and manipulate data on web pages.

Central server 102 may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

Central server 102 may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones, multiprocessor systems, minicomputer systems, microprocessor systems, mainframe computers, distributed computing environments that include any of the above systems or devices, and the like.

Central server 102 may utilize computer-executable instructions, such as program modules, executed by a processor. Generally, program modules include routines, programs, objects, components, data structures, etc. that perform particular tasks or implement abstract data types. A server may be operational with distributed computing environments where tasks are performed by remote processing devices that are linked through a communications network.

In a distributed computing environment, program modules may be located in both local and remote computer storage media including memory storage devices. A server may rely on a network of remote servers hosted on the Internet to store, manage, and process data (e.g., "cloud computing" and/or "fog computing").

Central server 102 may include database 106. Database 106 may include numerous tables. The tables may store data associated with the users. In this exemplary diagram, database 106 is configured to store personal identification data associated with each user. Each user may be assigned a user identifier. Each user may have the user's identification data stored under the user identifier.

Central server 102 may also include a token application generator 104. Token application generator 104 may be configured to generate mobile token applications for users and push the mobile token application to the user's mobile device for activation. Mobile token applications, for the purposes of the disclosure, may be activated on a user's mobile device in order to provide token identifiers for authentication of the user in place of the identity of the user.

Illustrative system 100 may include the token activation process for installing a mobile token application on a single user's mobile device. When a user requests activation of a mobile token application on the user's mobile device, central server 102 may be the trusted source for all the communications.

In this token application process, token application generator 104 may be configured to transmit mobile token application 108 to a user's mobile device 110. Mobile device 110 may be configured to execute the activation of the mobile token application 108 as shown at 112.

In some embodiments, the activation of the mobile token application 108 may include a secure handshake 114 between the two systems. The secure handshake between central server 102 and mobile device 110 may include receipt of a communication from the secure central server 102. The communication may include the mobile token application 108 (or a hyperlink that enables download of the mobile token) and an activation code. In other embodiments, mobile token application 108 may be included in an email with instructions shown at 110. In yet other embodiments, a hyperlink may be included in the email with instructions. The hyperlink, when selected may open a browser and direct the browser to a web page that downloads mobile token application 108 to mobile device 102. The central server 102 may transmit an email with instructions and an activation code to mobile device 102.

The mobile device 110 may validate the activation code by communicating with the secure central server 102. Mobile device 102 may receive selection of a PIN. Mobile device 102 may validate the PIN with the secure central server. Upon completion of the activation code validation and PIN validation, the mobile token application 108 may be activated on the mobile device 110. Secure central server 102 may store a user identifier that identifies a user of the mobile device, a token serial number that identifies the mobile token application and a device registration number that identifies mobile device 110.

Mobile token application 108 may be stored in a secure storage on the mobile device 110. Mobile device 108 may be enabled to be in direct communication with central server 102.

Figure 2:
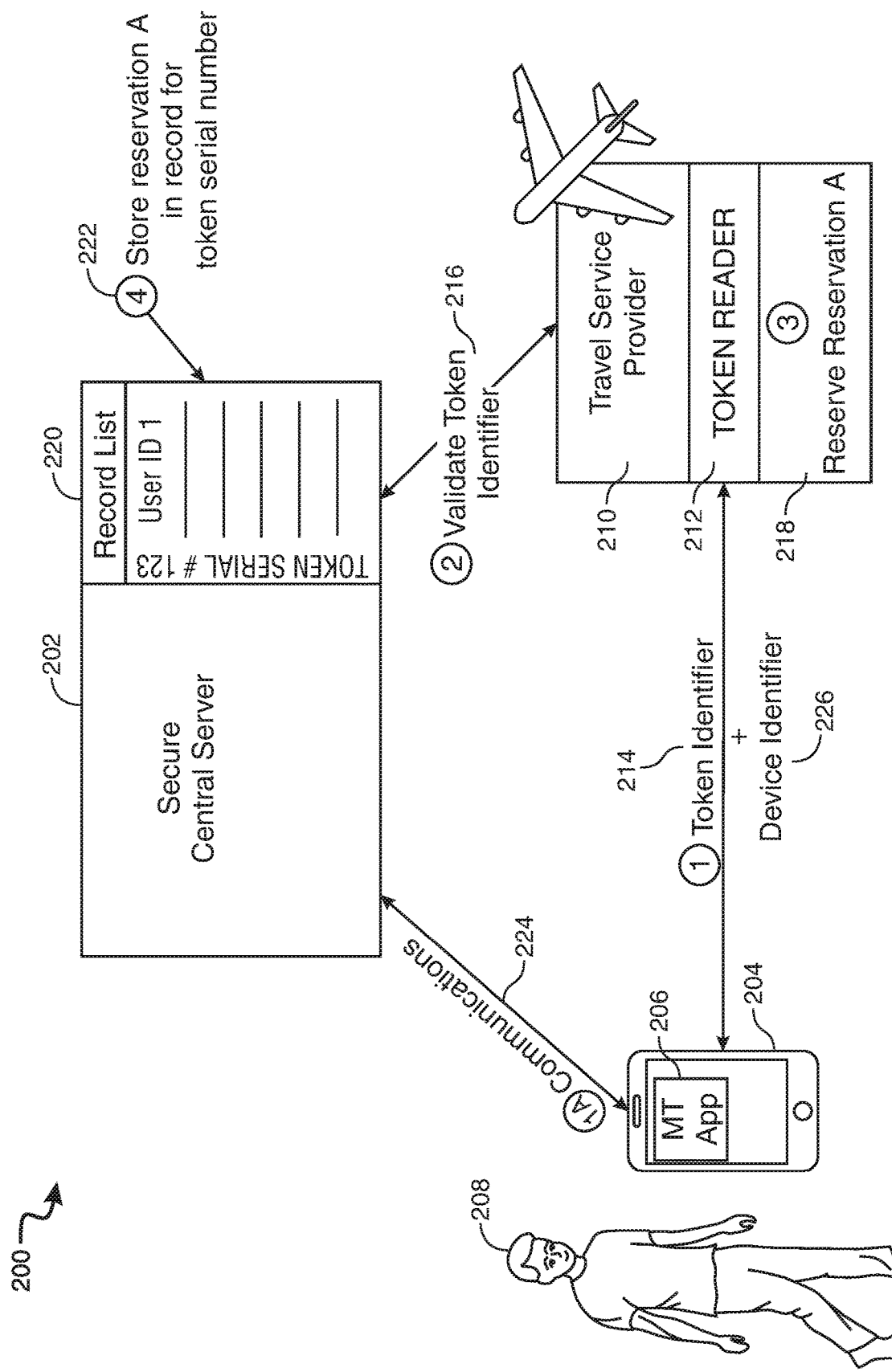
FIG. 2 shows an exemplary diagram in accordance with principles of the disclosure.

FIG. 2 shows an exemplary diagram 200. Exemplary diagram 200 shows a traveler securing a travel reservation using token identifiers as personal identification in accordance with principles of the disclosure.

Exemplary diagram 200 may include a secure central server 202. Traveler 208 may be a user of the entity associated with central server 202. Traveler 208 may be the owner of mobile device 204. Traveler 208 may be assigned a user identifier by the central server 202. Identification data and other data associated with traveler 208 may be stored under the user's identifier. Mobile device 204 may be registered at the central server as the user's mobile device and may be assigned a device identifier. The device identifier may also be stored under the user's identifier.

Mobile token application 206, when activated on the traveler's mobile device, may include a token serial number. The token serial number may be stored under the user's identifier at the central server 202. Each event where the mobile token application 206 generates a token identifier, the token identifier and other identifying information may be stored in a record under the token serial number associated with the token application 206.

At step 1, shown at 214, traveler 208 may be in communication with travel service provider 210 in order to reserve a flight. Mobile token application 206 on the traveler's mobile device may be configured to generate a token identifier 214. Token identifier 214 may be transmitted to the travel service provider 210. Travel service provider 210 may be a computing device that may include a token reader 212. Token reader 212 may be configured to retrieve the token identifier.

Travel service provider 210 may also capture the device identifier 226 from mobile device 204 in order to validate the token identifier 214.

In some embodiments, when the traveler may be in close distance to the travel service provider computing device, token reader 212 may be configured to retrieve the token identifier 214 from the mobile device 204 using NFC capabilities. In other embodiments, when the traveler may not be within close distance, the transmitting of the token identifier 214 may be an electronic transmission over the internet.

At the same time as step 214, or prior to step 214, there may be a communication between mobile device 204 and central server 202, as shown at 1A step 224. The communication may include data notifying central server 202 that a token identifier has been or is being sent to travel service provider 210.

At step 2, 216, travel service provider 210 may validate the token identifier 214 with central server 202. Central server 202 may retrieve from travel service provider 210, device identifying data. Central server may search the database located on central server 202 to identify a user identifier associated with the token identifier 214 and the device identifier 226. Upon identification of the user identifier associated with both token identifier 214 and device identifier 226, central server 202 may validate the token identifier and confirm validation with travel service provider 210.

In response to the confirmation, travel service provider may reserve a reservation A and save a travel reservation file for traveler 208 at step 3, 218. At step 4, 222, central server 202 may store the reservation A and the token identifier 214 within the record 220 of the user associated with token serial number 123.

It should be appreciated that travel service provider 210 may store a travel reservation file for reservation A for traveler 208. Traveler 208 may be identified by the travel service provider by the token identifier 214. There may be no identifying information associated with the traveler at the travel service provider 210. Personal identifying data may only be stored at the central server 202 and may only be accessed by central server 202. Traveler 208 may remain anonymous to the travel service provider 210.

Figure 3:
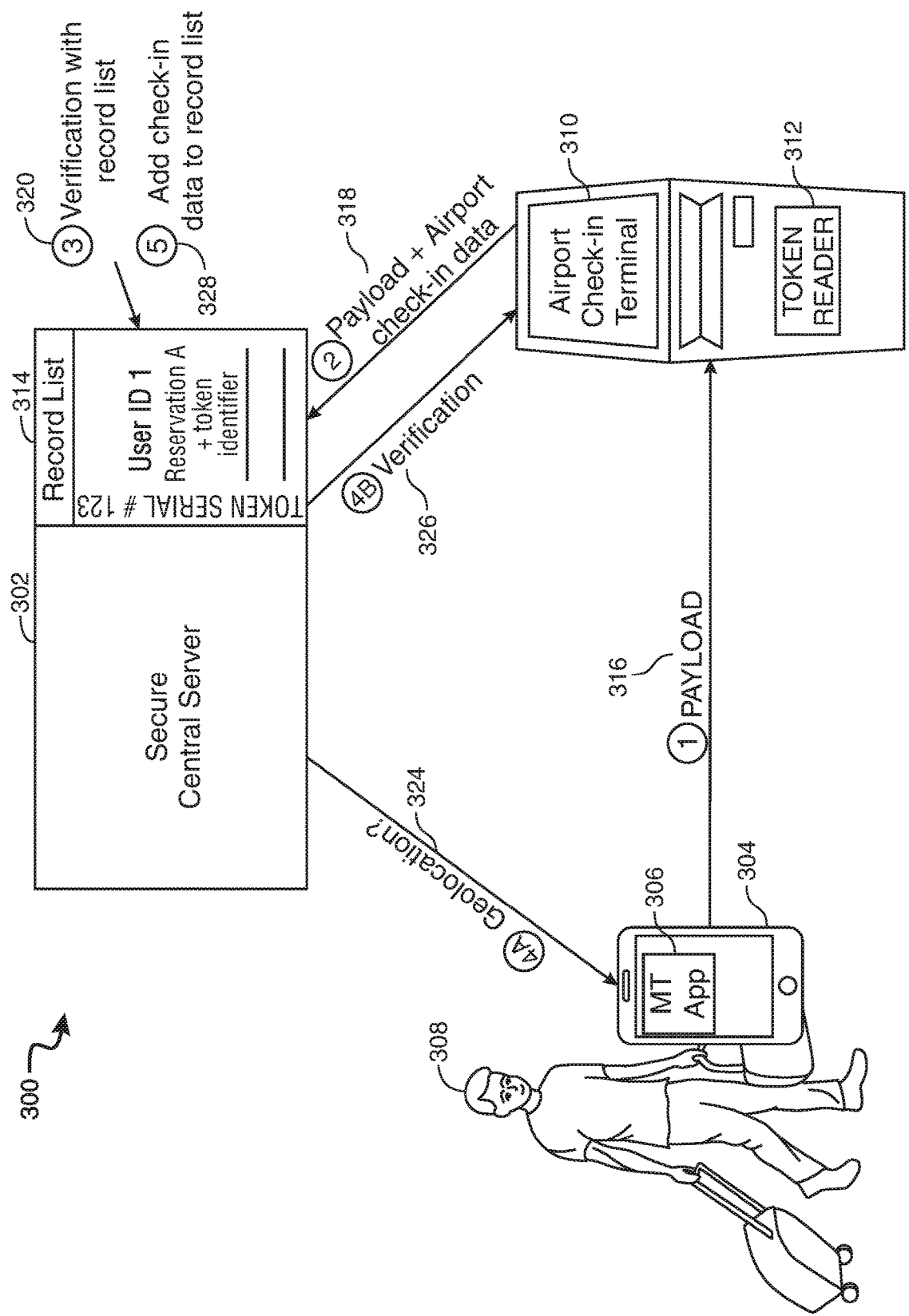
FIG. 3 shows an exemplary diagram in accordance with principles of the disclosure.

FIG. 3 shows an exemplary diagram 300 in accordance with principles of the disclosure. Exemplary diagram 300 may display the process for checking in for a flight for the reservation reserved in FIG. 2, using the token identifier.

Traveler 308 may approach airport check-in terminal 310. Traveler 308 may use the mobile device 304 to authenticate the identity of traveler 308 and confirm the flight. At step 1, 316, payload may be transmitted to the airport check-in terminal 310. The payload may include a token identifier generated by mobile token application 306. The payload may also include the device identifier. The payload may also include the geolocation of mobile device 304, in real-time.

Airport check-in terminal 310 may include a token reader 312. The token reader 312 may retrieve the payload. At step 2, 318, the payload may be transmitted to the central server 302 in order to authenticate the traveler. Airport check-in data may also be transmitted to the central server 302, at step 2, 318. Central server 302 may search the database to identify a user identifier associated with the token identifier and device identifier included in the payload.

At step 3, 320, central server 302 may verify the payload with the user identifier. User 101 may be identified to be associated with the token identifier and the device identifier for reservation A. Prior to confirming the reservation, central server 302 may retrieve the geolocation directly from mobile device 304, as shown at step 4A, 324. Central server may check and confirm that the retrieved geolocation matches the geolocation included in the payload and further matches the geolocation retrieved within the airport check-in data at step 318.

Upon confirmation that the geolocation of the airport check-in terminal 310 matches the geolocation of the mobile device 304 and further that the device identifier and token identifier are determined to be associated with the user identifier 101 of traveler 308, central server 302 may transmit a verification message to airport check-in terminal 310 as shown at step 4B, 326.

Following verification, central server 302 may add the payload data and check-in data to the record associated with token serial number 123 within a record list 314, as shown at step 5, 328. At this point in the process, traveler 308 may be authenticated and may be enabled to travel. It should be appreciated that the checking-in of the traveler may be enabled without identifying the traveler's identity and yet authenticating the traveler through a secure central system.

Figure 4:
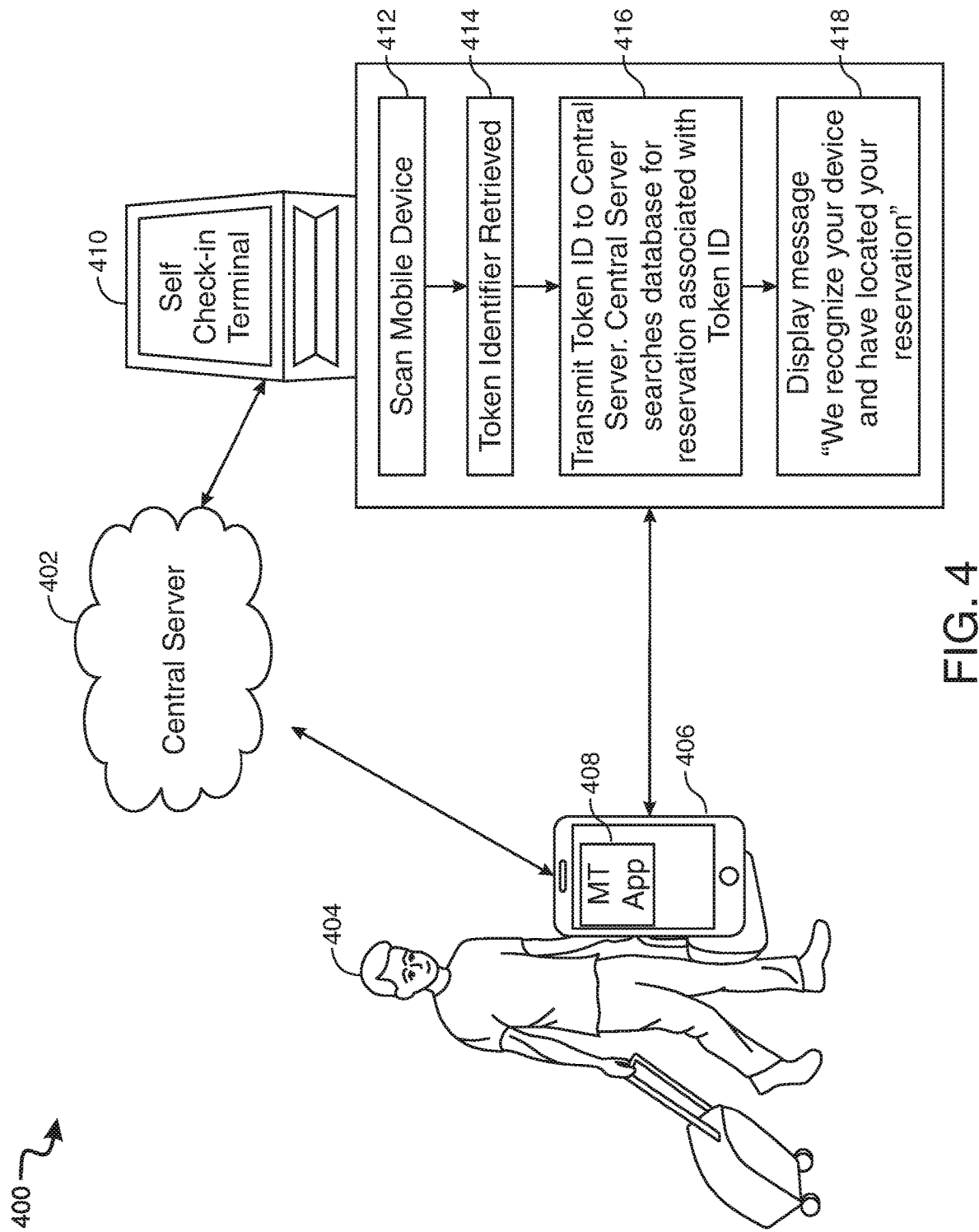
FIG. 4 shows an exemplary diagram in accordance with principles of the disclosure.

FIG. 4 shows an exemplary flowchart 400 in accordance with principles of the disclosure. The steps in the process may occur at the self-check-in terminal 410. Self-check-in terminal 410 may be in direct communication with central server 402 in order to authenticate the traveler 404 associated with mobile device 406.

At step 412, traveler 404 may scan the mobile device 406 at the terminal 410. At step 414, a token identifier may be retrieved from mobile device 406. Token identifier may be generated by the mobile token application 408.

At step 416, the token identifier may be transmitted to the central server for authentication. Central server 402 may search the database to identify a reservation associated with the token identifier.

At step 418, central server 402 may identify the reservation and confirm the token identifier to be associated with the user identifier and device identifier of the traveler 404. Upon verification and confirmation to the self-check-in terminal 410, a message may be displayed at the computing station of the self-check-in terminal 410 notifying the traveler 404 that a reservation associated with your mobile device has been identified.

Figure 5:
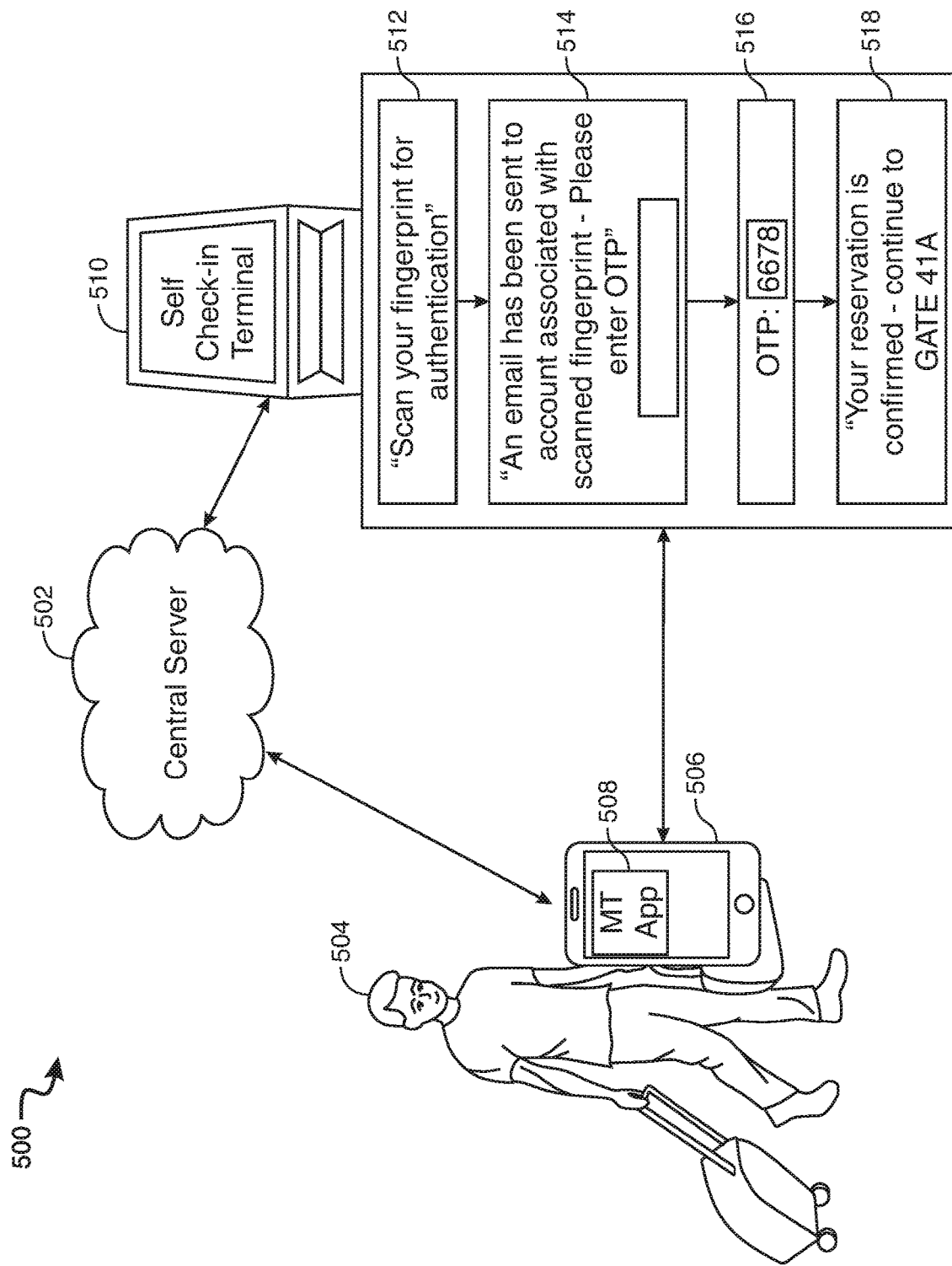
FIG. 5 shows an exemplary diagram in accordance with principles of the disclosure.

FIG. 5 shows an exemplary diagram 500 in accordance with principles of the disclosure. FIG. 5 may be a continuation of the process shown in FIG. 4.

As an additional layer of authentication, the traveler may be requested to input a biometric, as shown at step 512. In this example, a fingerprint scan may be requested. Biometrics associated with the traveler may be stored at the central server within the records associated with the user.

Upon verification of the fingerprint at the central server to be associated with traveler 504, central server 502 may transmit a communication to the mobile device 506, as shown at 514. The communication may include a one-time password. When the traveler receives the one-time password on mobile device 506, traveler 504 may input the OTP into a display box as shown at 516.

Central server 502 may confirm the OTP and confirm the reservation for traveler 504, as shown at 518.

Thus, methods and apparatus for leveraging a tokening system to authenticate a traveler is provided. Persons skilled in the art will appreciate that the present invention can be practiced by other than the described embodiments, which are presented for purposes of illustration rather than of limitation, and that the present invention is limited only by the claims that follow.

What is claimed is:

1. A method for leveraging a tokening system to authenticate a traveler, the tokening system maintaining anonymity of the traveler, the method comprising:
  activating a mobile token application on a user's mobile device, the mobile token application associated with a central server, the mobile token application for providing a token identifier representing the user's personal identification data, the mobile token application being activated and stored in a secure storage on a mobile device of the user, the mobile device of the user registered within the central server;
  storing, in the central server, a user identifier that identifies the user of the mobile device, a token serial number that identifies the mobile token application and a device identifier that identities the mobile device; and
  reserving, using the mobile token application on to mobile device, a travel reservation tile for a travel reservation for the user using at least one travel service provider, the travel service provider in direct communication with the central server, the reserving comprising:
    receiving, at the travel service provider, a token identifier front the mobile token application on the user's mobile device and the device identifier;
    transmitting the token identifier and the device identifier from the travel service provider to the central server;
    authenticating the token identifier and the device identifier by the central server:
    in response to the authenticating:
    reserving, by the travel service provider, the travel reservation file comprising the token identifier as representation of the identity of the user;
    storing the travel reservation file at the travel service provider; and
    storing, in the central server, the token identifier and the travel reservation file in a record associated with the user identifier.

2. The method of claim 1 wherein the mobile token application is a temporary mobile token application and the central server is configured to terminate the mobile token application after a pre-determined amount of time.

3. The method of claim 2 wherein the pre-determined amount of time is a date of expiration of the travel reservation.

4. The method of claim 1 wherein the token identifier is generated by the mobile token application.

5. The method of claim 1 wherein the token identifier is one of a unique identifier, QR code and a one-time password ("OTP").

6. The method of claim 1 wherein the user's personal identification data comprises a name of the user, date of birth of the user and social security number of the user.

7. The method of claim 1 wherein the mobile token application on the user's mobile device is linked to the personal identification data stored on the central server, solely via the central server.

8. A system for leveraging a tokening system to authenticate a traveler, the authentication without exposing an identity of the traveler, the system comprising:
  a central server configured to store personal identification data associated with a plurality of users;
  a mobile token application configured to be activated by the central server on a mobile device of a user associated with the central server, the mobile device registered with the central server by a device identifier, the user from the plurality of users;
  the mobile device in direct communication with the central server, the mobile device configured to store the mobile token application on the mobile device;
  a travel service provider in direct communication with the central server, the travel service provider configured to enable reserving a travel reservation file, the travel reservation file being reserved for the user while maintaining anonymity of the user's identity, the travel service provider comprising a token reader for retrieving token identifiers from a user's mobile device as representing the identification of each user;
  wherein, when the mobile device is in communication with the travel service provider, the central server is configured to:
    transmit the mobile token application to the mobile device; and
    activate the mobile token application on the mobile device;
  the mobile token application is configured to:
    generate a token identifier for use as identity of the user of the mobile device; and
    transmit the token identifier to the travel service provider for a travel reservation; and
  the central server is further configured to;
    receive the token identifier from the travel service provider;
    verify the token identifier to be associated with the mobile device of the user;
    confirm the verification with the travel service provider; and
    store the travel reservation within a token record associated with the user on the central server.

9. The system of claim 8 wherein the mobile token application resides, temporarily, on the mobile device.

10. The system of claim 8 wherein the personal identification data stored on the central server comprises, for each of the plurality or users, a name of the user, date of birth of the user and social security number of the user.

11. The system of claim 10 wherein the personal identification data is stored on a database on the central server.

12. The system of claim 8 wherein the database is further configured to store a token record for each of the plurality of users, the token record comprising data associated with each token identifier generated by the mobile token application on the mobile device of the user.

\* \* \* \* \*